United States Patent
Hoyt et al.

(10) Patent No.: US 8,708,323 B2
(45) Date of Patent: Apr. 29, 2014

(54) MOUNTING SYSTEM

(75) Inventors: Ted Hoyt, Placentia, CA (US); Terry Schron, Garden Grove, CA (US); Bob Rubenstahl, Twinsburg, OH (US); Joseph Russell Cousins, Kittanning, PA (US); Darel R. Taylor, Concord, OH (US)

(73) Assignee: Jergens, Inc., Cleveland, OH (US)

( * ) Notice: Subject to any disclaimer, the term of this patent is extended or adjusted under 35 U.S.C. 154(b) by 330 days.

(21) Appl. No.: 13/226,841

(22) Filed: Sep. 7, 2011

(65) Prior Publication Data
US 2012/0085875 A1   Apr. 12, 2012

Related U.S. Application Data

(60) Provisional application No. 61/380,605, filed on Sep. 7, 2010.

(51) Int. Cl.
*B23Q 3/00*   (2006.01)

(52) U.S. Cl.
USPC ............... 269/309; 269/289 R; 248/346.03; 248/551

(58) Field of Classification Search
USPC .......... 248/346.01, 346.03, 550, 551; 269/37, 269/91, 289 R, 309
See application file for complete search history.

(56) References Cited

U.S. PATENT DOCUMENTS

| | | | |
|---|---|---|---|
| 2,707,419 A | 5/1955 | Schron | |
| 4,881,727 A | 11/1989 | Nemirovsky | |
| 4,932,295 A | 6/1990 | Erickson | |
| 5,167,405 A * | 12/1992 | Cayley, Jr. | 269/309 |
| 5,288,182 A | 2/1994 | Patterson et al. | |
| 5,308,050 A * | 5/1994 | Schroder | 269/309 |
| 8,534,658 B2 * | 9/2013 | Schron et al. | 269/289 R |
| 2004/0256780 A1 | 12/2004 | Lang | |
| 2007/0063405 A1* | 3/2007 | Troxler | 269/309 |
| 2008/0174077 A1 | 7/2008 | Lang | |
| 2010/0316439 A1 | 12/2010 | Schron, Sr. et al. | |
| 2013/0043634 A1* | 2/2013 | Kitaura et al. | 269/309 |

FOREIGN PATENT DOCUMENTS

DE   10 2009 009 212 B3   6/2010

OTHER PUBLICATIONS

Jergens, Inc.; "Ball Lock Mounting System"; pp. 1.4-1.21.
International Search Report and Written Opinion dated Nov. 28, 2011 in corresponding International Application No. PCT/US2011/050635, filed Sep. 7, 2011.

* cited by examiner

*Primary Examiner* — Gwendolyn Baxter
(74) *Attorney, Agent, or Firm* — Rankin, Hill & Clark LLP

(57) ABSTRACT

A mounting system including a plunger system wherein the sides of the plunger are utilized to engage a stud and the side of the plunger has a plunger cam that can have virtually any desired cam angle and/or configuration to produce a desired pull down and/or locking action.

29 Claims, 6 Drawing Sheets

MOUNTING SYSTEM

This application claims priority in Provisional Patent Application Ser. No. 61/380,605 filed on Sep. 7, 2010 and which is incorporated by reference into this application.

This invention of this application relates generally to the art of mounting systems and, more particularly, to a mounting system used as a quick-change mounting and locating system for tooling and the like.

Mounting systems are known in the art and have been used over the years to accurately mount one structure to a substrate structure. With respect to the invention of this application, it has been found that the mounting systems work particularly well to accurately mount a workholding device onto a subplate wherein the subplate can be fixed relative to a machining table. Thus, this application will be described with reference to these structures but has broader application wherein this description should not be considered limiting in nature.

INCORPORATION BY REFERENCE

Quick-change tooling and mounting systems have been used over the years and come in many forms wherein some of these forms are simple designs while others are more complex. These prior systems are hereby incorporated by reference into this application and form part of this specification. Many of these systems have been around for a number of years such as U.S. Pat. No. 2,707,419, to Schron which discloses a system for locating a fixture plate. U.S. Pat. No. 4,932,295 to Erickson discloses an automatic clamping unit for receiving and holding a tool holder. These systems have been improved over the years and these improvements include JERGENS' BALL LOCK mounting system which is a quick change system for mounting one structure to another structure wherein attached are printouts disclosing this system. Further U.S. patent application Ser. No. 12/754,026 to Schron discloses a mounting system for joining a fixture plate to a subplate and the like. Again, all of these devices and patents are incorporated by reference into this application and form part of this specification.

The above referenced systems have been found to be very effective in this art, but relate to a mounting system that has individual locking shanks wherein each shank must be secured individually. Over the years, these systems have been improved wherein U.S. patent application Ser. No. 10/495,076 to Lang discloses a jig which can be precisely repositioned. U.S. Pat. No. 5,167,405 to Cayley. Jr. discloses a fast change set-up device for work on work support. U.S. Pat. No. 4,881,727 to Newirovsky discloses a clamping mechanism. U.S. patent application Ser. No. 12/014,236 to Lang discloses a self-centering chuck. Further, Midaco Corporation sells a Micro Pallet System MPS for work holding wherein the attached printouts of this system are attached. Again, all of these referenced devices, patents and applications are hereby incorporated by reference into this application and form part of this specification.

BACKGROUND OF THE INVENTION

Again, the invention of this application relates to mounting system and will be described in connection with fixture plates and subplates; however, the invention of this application has a much broader application and can be used in connection with a wide range of quick-change systems and even long-term mounting systems. Mounting systems have been used over the years for a wide range of applications and can be used to quickly and accurately locate and lock a fixture plate or other workholding device to a subplate. Further, additional mounting and/or positioning structures can be used in connection with the workholding system. The above referenced patents, applications and devices show a progression in the art which as led to the invention of this application.

More particularly, it has been found that the LANG workholding system provided improvements in the art for locating and holding a fixture plate to a subplate. However, it has also been found that the LANG system has deficiencies and inefficiencies. In particular, and with reference to U.S. patent application Ser. No. 10/495,076 and U.S. patent application Ser. No. 12/014,236 both to Lang, the mounting systems utilize the ends of the clamping plungers to engage his positioning pins. This configuration has been found to have many deficiencies and inefficiencies. One of these problems is that this design requires a plunger for each positioning pin. Further, by utilizing the end of the plunger for the hold-down engagement, the caroming angles of the system can be to great thereby increasing the force needed to provide the desired hold-down forces and/or increasing the pin diameter of the positioning pins or studs. Including the cam on the end of the plunger also causes the lateral loads on these plungers to be at the end of the plunger wherein the support of these lateral loads can only be from one side of the load. As can be appreciated, this can produce a moment force in the plunger body. These conditions adversely affect the cost of the mounting system, the longevity of the system and the overall performance of the system. Further, it increases the number of parts and machining operations needed to produce the system which can result in quality issues. As a result, these systems can be expensive and they can produce machining variations in operation. Similarly, U.S. Pat. No. 5,167,405 to Cayley. Jr. and U.S. Pat. No. 4,881,727 to Newirovsky use the end of the clamping plungers to engage the positioning pins. As can be seen by all of these discloses, these mounting systems include many parts and require many complex machining operations to produce.

SUMMARY OF THE INVENTION

In accordance with the present invention, provided is a mounting system that has the useful benefits of the prior art mounting systems but which overcomes many of the shortcomings in these prior art systems. More particularly, provided is a mounting system for securing a fixture plate or work holding device to a subplate which both locates the workholding device and which provides significant clamping forces to vastly reduce machining variations. Further, the system of this application is a quick change system and can be used with a wide variety of workholding devices and elements and can be used in connection with a wide range of machining equipment.

More particularly, the mounting system according to the present invention includes a plunger system wherein the sides of the plunger are utilized to engage a stud wherein the side of the plunger has a plunger cam that can have virtually any desired cam angle and/or configuration to produce a desired pull down and/or locking action. Yet even further, this desired cam configuration can be achieved without adversely increasing the size of the stud or the overall strength of the stud Even further, this arrangement allows the later forces to be supported by the plunger on both sides of the cam thereby eliminating any moment forces within the plunger body.

According to one set of embodiments, provided is a mounting system for supporting a workholding device having a base block with a block bottom and a block top with at least one side block surface between the block bottom and top. Again, as referenced above, in the interest of brevity, this application is being described in connection with a particular style of block mounted on a horizontal base, however, the invention of this application can mount to any kind of based plate and in any orientation. Thus, terms such as "bottom" and "sides" in both the description and the claims are not to be limited to a specific orientation. For example, the "bottom" does not need to face downwardly and the "sides" do not need to face horizontally.

The base block includes a plunger passage and a stud passage and the plunger passage extends into the base block from the at least one side surface and extends inwardly along a plunger axis. The stud passage extends into the base block from one of the block bottom and the block top along a stud axis and the stud axis being generally transverse to the plunger axis and radially spaced from the plunger axis. The stud passage intersects the plunger passage in a locking region. The system further includes a plunger extending along a plunger axis between an inner end and an outer end and has an outer plunger surface between the ends that is at least partially shaped to be received in the plunger passage such that the plunger moves axially along the plunger axis between an unlocked condition and a locked condition. The plunger having a radially extending pocket or region with a plunger cam and an axially spaced clearance path. The system further including a stud shaped to be received in the stud passage and the stud being connectable with an associated workholding device and extending between a stud inner end and a stud outer end along a stud axis. The stud having a stud cam or locking groove between the stud ends. When in the unlocked condition, the clearance path of the plunger allowing the stud groove or cam to enter the locking region. Once the stud is in the locking region, axial movement of the plunger along the plunger axis engages the plunger cam against the stud cam thereby urging the stud into the stud passage and/or into a desired locking position within the passage and providing the hold-down and/or locking force for securing the associated workholding device relative to the base block.

According to another set of embodiments, provided is a mounting system for supporting a workholding device wherein the plunger includes a plunger thread and the base block including a block thread threadingly engagable with the plunger thread to produce the axial movement of the plunger. Yet even further, the plunger can include both a plunger body and an annular nut rotatable relative to the plunger body wherein the annular nut includes the plunger thread and is configured to urge the plunger body axially inwardly into the plunger passage. The plunger can further include a return spring engagable between the plunger body and the base block to move the plunger body outwardly in the plunger passage. In yet another embodiment, the plunger can include a plunger sleeve extending about a plunger shaft of body and the plunger sleeve can include the plunger cam. This is another way to maintain the desired orientation of the plunger cam(s).

According to a further set of embodiments, provided is a mounting system for supporting a workholding device wherein the stud passage is a first stud passage and the base block further including a second stud passage space axially from the first stud passage along the plunger axis forming a second locking region. The radially extending cam region being a first cam region with a first plunger cam and an axially spaced first clearance path. The plunger can further include a second cam region with a second plunger cam and an axially spaced second clearance path for the second locking region.

According to a further set of embodiments, provided is a mounting system for supporting a workholding device wherein the system includes a plurality of plungers and a plurality of studs. Further, at least one of the studs can also be a locating stud for locating the associated device with the base block. In yet further embodiments; there can be a plurality of locating studs.

According to a further set of embodiments, provided is a mounting system for supporting a workholding device wherein the system includes multiple plungers.

According to a further set of embodiments, provided is a mounting system for supporting a workholding device wherein the system further includes a mounting arrangement to secure the base block to another workholding element. This mounting arrangement can be any mounting arrangement known in the art including, but not limited to threaded screws and/or locating pins. Yet even further, the system can include other workholding element including risers, sub plates, tomb stones and base plates. Yet further, the system can be utilized with a wide range of workholding devices including, but not limited to fixturing plates, dumb bell risers and vises In any of these embodiments, the stud can be fixed relative to the devices or intricately formed in these devices.

These and other objects, features, embodiments and advantages of the invention will become apparent to those skilled in the art upon a reading of the detailed description of the invention set forth below, taken together with the drawings which will be described in the next section.

BRIEF DESCRIPTION OF THE DRAWINGS

The invention may take physical form in certain parts and arrangements of parts, and a preferred set of embodiments of which will be described in detail and illustrated in the accompanying drawings, which form a part of the specification and wherein.

DETAILED DESCRIPTION OF THE INVENTION

Figure 1:
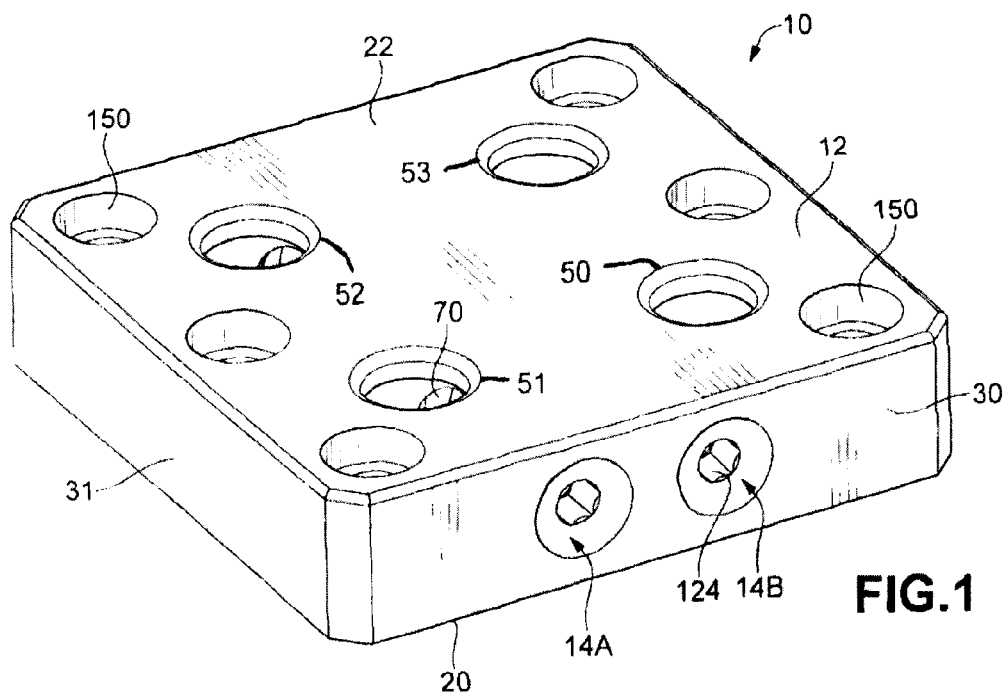
FIG. 1 is a top perspective view of a mounting system according to one set of embodiments of the present invention which includes two plungers and four stud passages.
Figure 2:
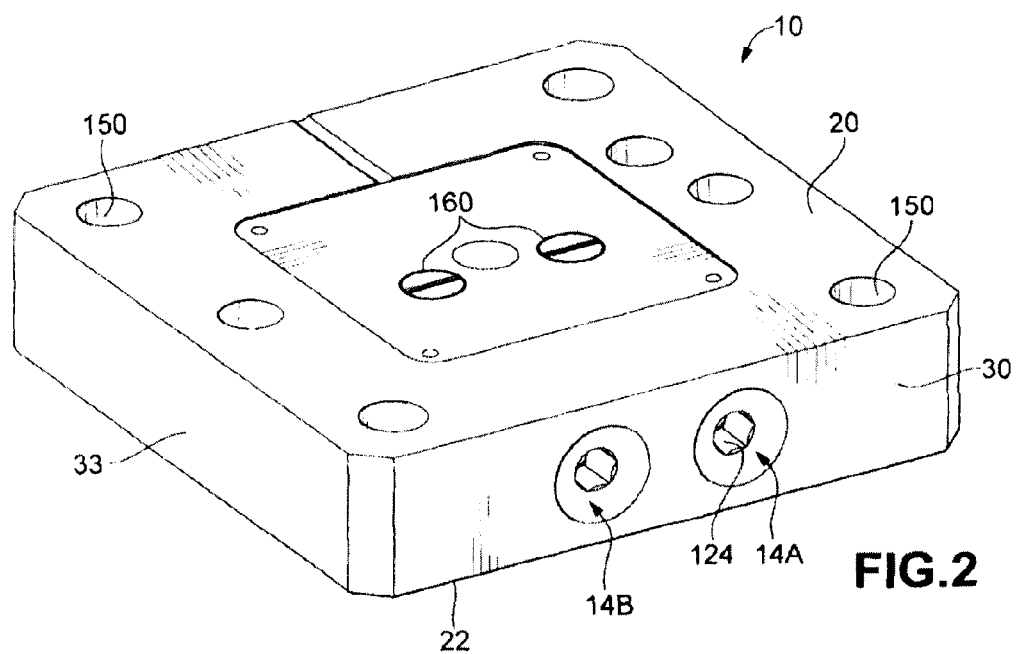
FIG. 2 is a bottom perspective view of the mounting system shown in FIG. 1.
Figure 3:
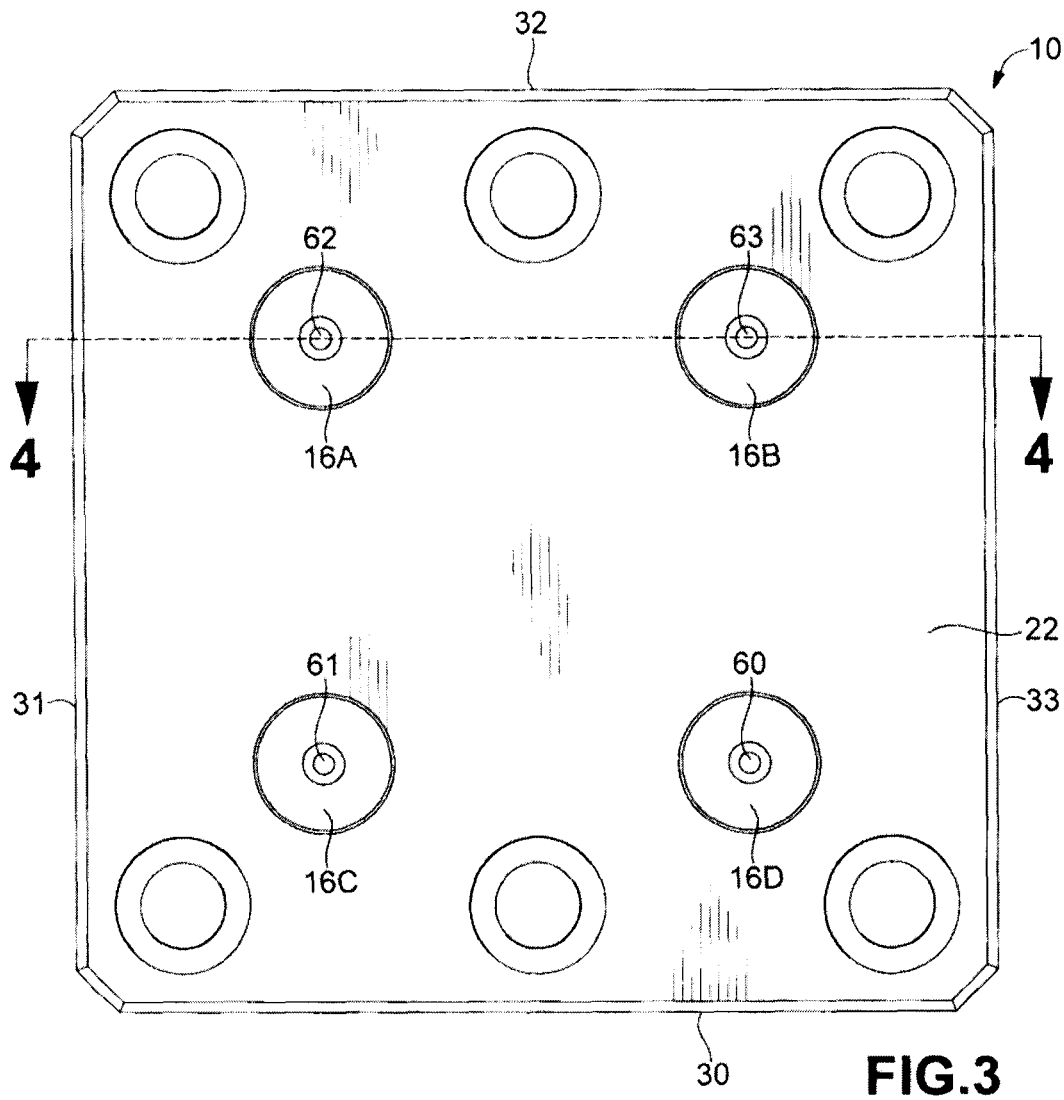
FIG. 3 is a top view of the mounting system shown in FIG. 1 with four studs in the stud passages.
Figure 4:
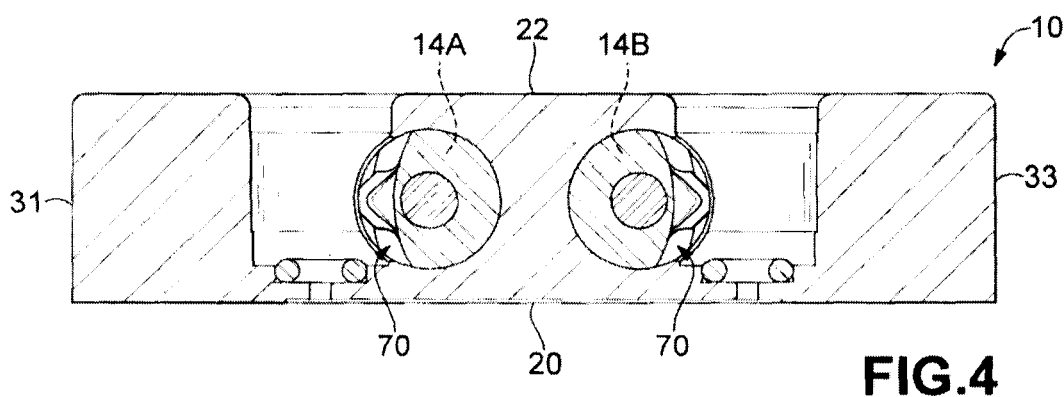
FIG. 4 is a sectional view taken along line 4-4 in FIG. 3.
Figure 5:
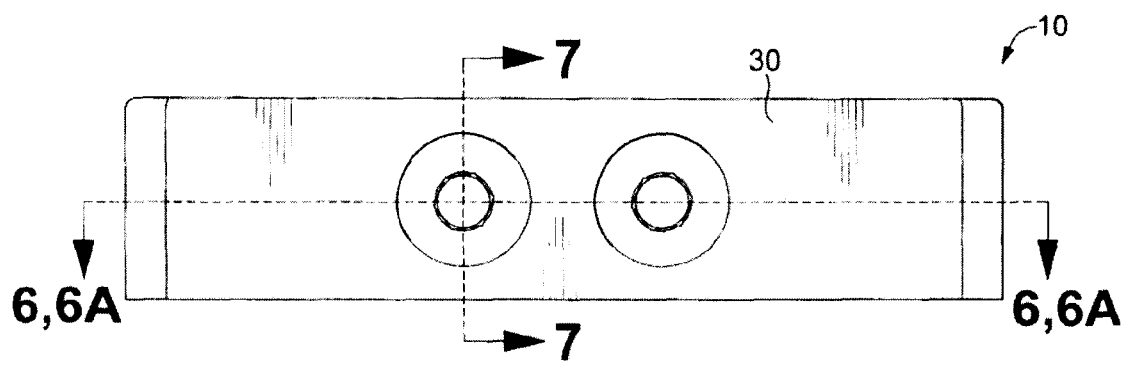
FIG. 5 is a side elevational view of the mounting system shown in FIG. 1.

Referring now to the drawings wherein the showings are for the purpose of illustrating preferred and alternative embodiments of the invention only and not for the purpose of limiting the same, shown in FIGS. 1-12 is a mounting system 10 that shows one of the multitude of embodiments of the invention of this application wherein the invention of this application is not to be limited to the example embodiment.

More particularly, shown is a system that includes a base block 12 and at least one plunger 14. The system can further include at least one pull down and/or locking stud 16 which work together with the plunger to secure an associated device or top tooling (not shown) to an underlying support surface (also not shown). Also, it should be noted that while block 12 is referred to as a base block, it does not need to be on the bottom of the tooling arrangement. Conversely, the top tooling could be mounted to block 12 and studs 16 could be mounted to a supporting block without detracting from the invention of this application. Thus, referring to block 12 as a base block in the specification and claims is not to be interpreted to designate an orientation or position relative to the tooling and machining tables unless specifically stated otherwise. Further, while the block is shown as rectangular, the block can be any shape and can include variations in the cross-sectional configuration without detracting from the invention of this application. Thus, the rectangular configurations of this application are merely for illustrative purposes only and are not to be treated as a limitation.

In the embodiment shown, the system includes two plungers 14A & 14B and four studs 16A-D; however, this is not required and more or less of both could be utilized. Further, the number of studs and/or plungers could be an odd or even number of one or both. Yet further, these components are being commonly numbered in the interest of brevity wherein each plunger and/or each hold down stud does not need to be the identical or even substantially similar to the other ones which will be discussed in greater detail below.

The top tooling can include and tooling known in the art including, but not limited to, one or more vises, dumb bells and/or fixture plates. Further, the underlying devices can be any support structure known in the art including, but not limited to, a tomb stone, a sub plate and a machine table.

With respect to the embodiment shown, base block 12 includes a block bottom 20 and a block top 22; however, this again is not to be interpreted to indicate the orientation of this block. Block 12 further includes a block sides 30-33 in that this particular embodiment is a four sided base block. Sides 30-33 can extend between block top 22 and block bottom 20 and can be any number of sides.

Base block 12 further including plunger passages 40 and 42 and four stud passages 50-53. The plunger passage can extend into the base block from any surface including extending inwardly from side 30 along passage axes 56 and 58, respectively. The stud passages can extend into the base block from block top 22 along stud axes 60-63 and the stud axes are generally transverse to the corresponding plunger axes and radially spaced from the corresponding plunger axes. The stud passages intersect the plunger passages in locking regions 70.

Figure 6:
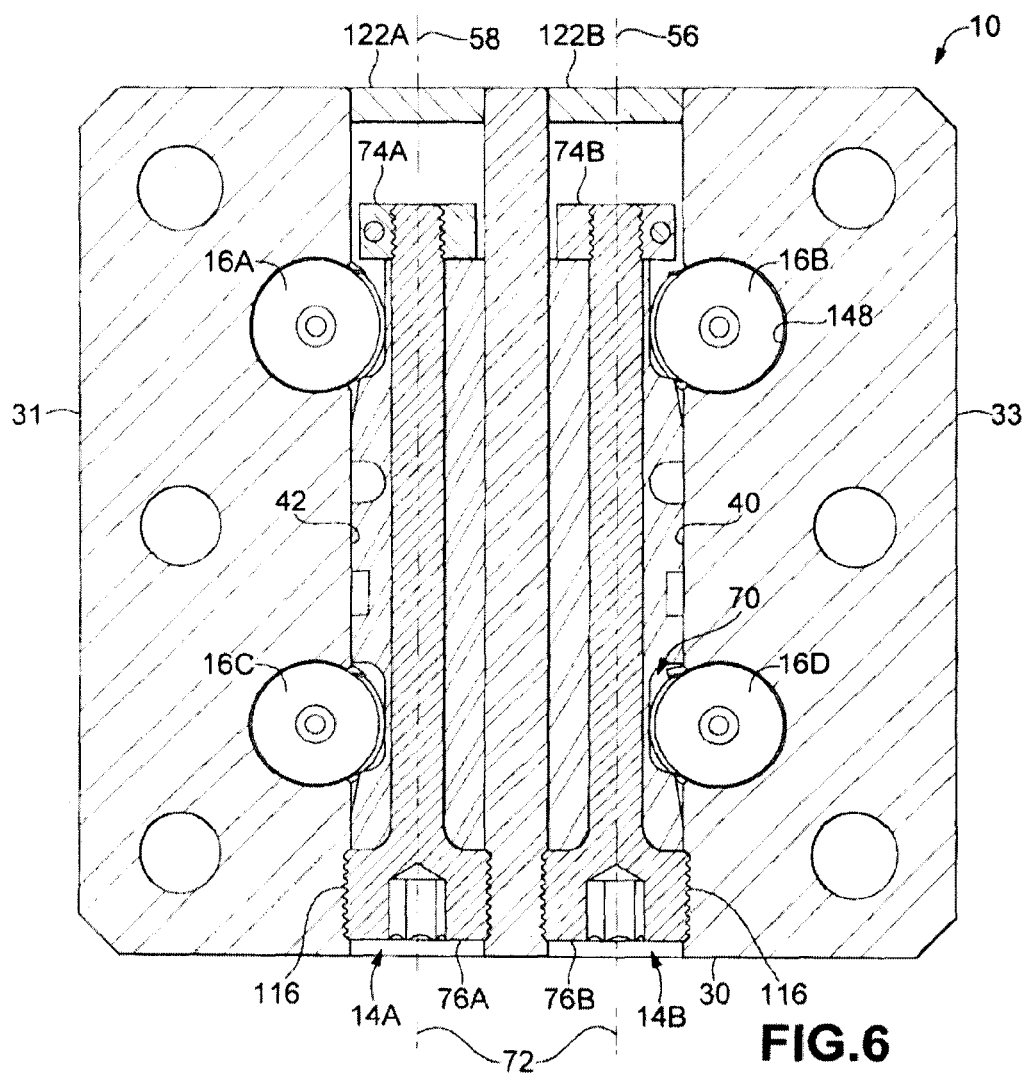
FIG. 6 is a sectional view taken along line 6-6 in FIG. 5 showing an unlocked condition.
Figure 6A:
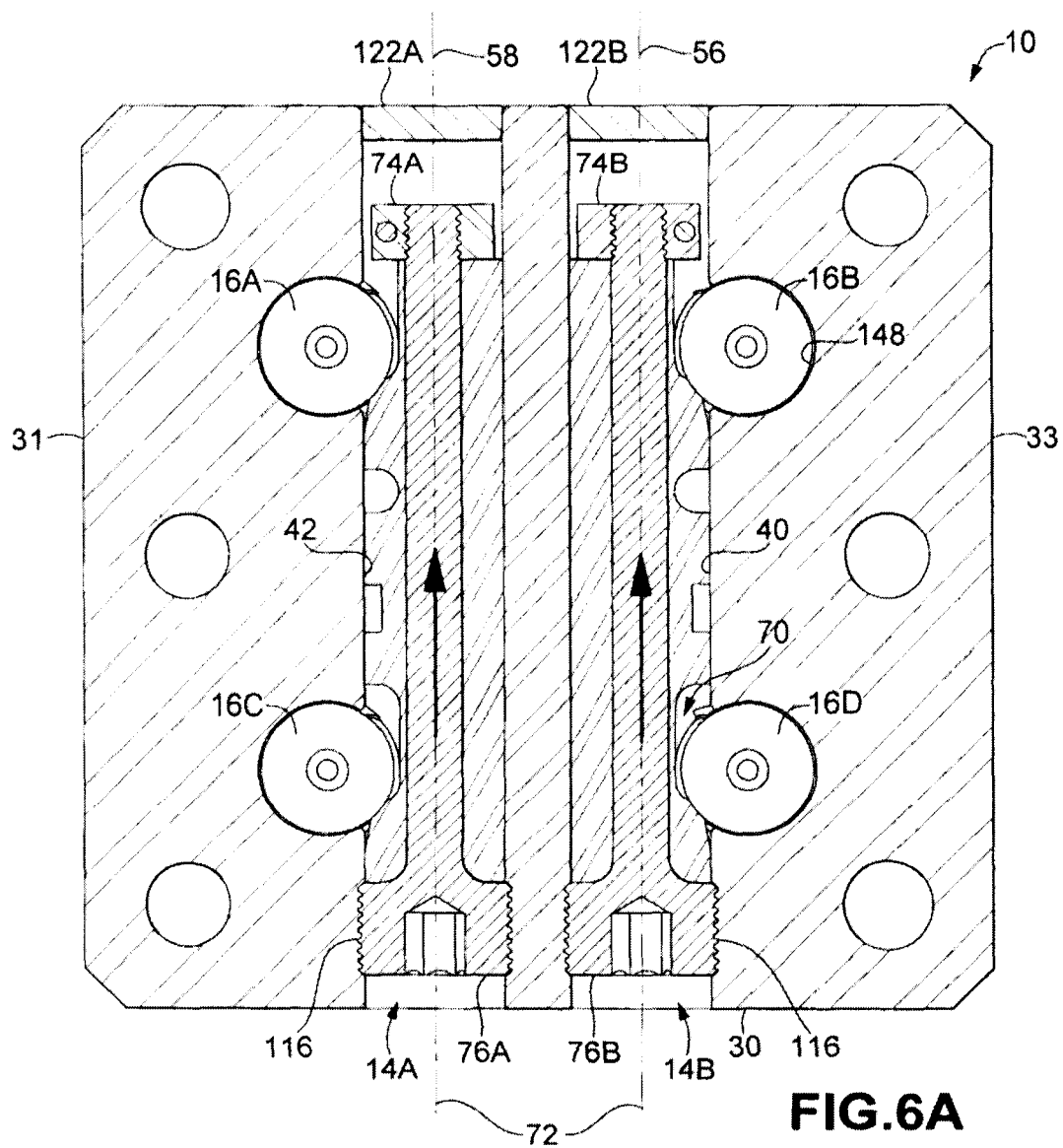
FIG. 6A is a sectional view taken along line 6A-6A in FIG. 5 showing a locked condition.
Figure 7:
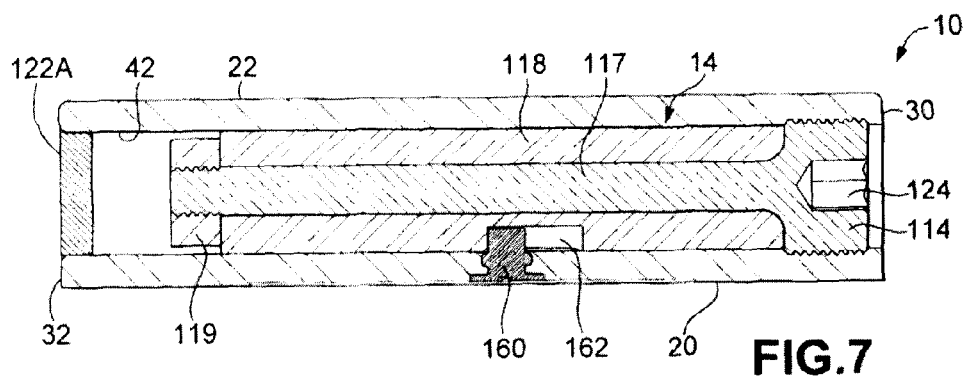
FIG. 7 is a sectional view taken along line 7-7 in FIG. 5.

The plungers 14 extend along a plunger axis 72 between an inner end 74 and an outer end 76. Plungers 14 further include a radially outwardly facing outer plunger surface 80 between ends 74 and 76 that is at least partially shaped to be received in the plunger passages 40 and 42 such that the plungers can move axially along the passage axis between an unlocked condition (FIG. 6) and a locked condition (FIG. 6A). The plungers can have one or more radial pockets or cam regions 90 in plunger surface 80 and these pockets can include a pull down or locking plunger cam 92 and an axially spaced clearance slot or path 94.

Studs 16 are shaped to be received in one of stud passages 50-53 and are connectable with one or more of the top tooling (again, not shown) to secure and position the tooling relative to block 12. Studs 16 extend between a stud inner end 100 and a stud outer end 102 and include an outer surface 103. Studs 16 further include a stud cam or locking groove 104 between the stud ends which will be discussed in greater detail below. When in the unlocked condition, clearance path 94 of the respective plunger is aligned with the stud passage allowing the stud to enter the stud passage and align the stud cam in the locking region. Once the stud cam is in the locking region, axial movement of the plunger along the plunger axis directs the respective plunger or pull down cam 92 into stud cam 104 thereby engaging the plunger cam against the stud cam and urging the stud into the stud passage and/or into a desired locking position thereby providing a holding force between the base block and the associated device for securing the associated top tooling relative to the base block.

According to yet other embodiments, plunger 14 can be formed by a plunger body 110, a plunger nut shaft 112 and a plunger nut 114. The annular nut can include the plunger thread for axial movement of the plunger between the unlocked and locked conditions. In this respect, passages 40 and 42 can have threaded portions 116 such that rotation of the plunger can urge the plungers into and out of the respective passage. In one set of embodiments, plunger 14 can include a plunger body 117 and a body sleeve 118. Sleeve 118 can be held in place by an end cap 119 on plunger body or shaft 117. Further, plunger nut 114 can also be configured to help hold sleeve 118 in place. In that this set of embodiments has a shaft that rotations, sleeve 118 can be configured to rotate about shaft 117 such that sleeve is at least generally maintained in a desired orientation relative to locking region 70 as plunger moves in and out of the plunger passage.

Further, plunger nut 114 can rotate relative to the plunger so that threaded rotation of the nut provides the necessary axial movement but does not rotate the plunger body such that the alignment between plunger 14 and the locking region 70 is maintained. In another embodiment, plunger 14 can further include a return spring (not shown). Yet even further, plunger passages 40 and 42 can either be a blind hole or a through hole. Further, if passages 40 and 42 are through holes, system 10 can further include an end cap 122, such as end caps 122A and 122B shown in the figures. that can threadingly engage with one or both of passages 40 and 42. Thus, the return spring can extend between the plunger and the cap. Plunger 14 can further include a tool receiving opening 124 to allow further actuation or rotation of the system between locked and unlocked conditions. In one set of embodiments, opening 124 can be in nut 114.

In yet other embodiments, plunger 14 can be actuated by any means known in the art including, but not limited to, pressurized air, hydraulics, toggle mechanisms and knobs.

As is referenced above, the mounting system can include one or more studs and one or more plungers. Further, base block 12 can be configured such that block top 22 can extend in any direction including, but not limited to extending horizontally.

According to other embodiments of the invention of this application, stud cam 104 of stud 16 can be a V-shaped cam that extends circumferentially about the corresponding stud axes 60-63. Further, stud 16 can be a cylindrical shaped stud wherein the orientation (rotational) of stud 16 relative to stud passages 50-53 is not important wherein cam 104 will align with locking region 70 regardless of the stud rotational orientation in the stud passage. In other embodiments, stud 16 can have other configurations and/or cam 104 can be configured to prevent rotation of the stud relative to the block when in the locked condition. While this can be handled by the clamping forces between the stud and the block, it can also be handled by mating configuration designed to prevent rotation (not shown).

As referenced above, the studs of this application do not need to be identical to each other wherein different studs can have different features. In this respect, one or more of studs 16A-D could include a locating features such as one or more locating surface portions 146 which can be ground to a desired tolerance and which can be configured to accurately align with a locating hole portion 148 in one or more of stud passages 50-53. This locating hole portion also can be ground to a desired tolerance. Further, the locating hole portion can be a separate component mounted to passages 50-53 of block 12. As can be appreciated, by utilizing a separate mounted component to block 12, special materials and/or heat treating can be used for this locating portion. Thus, while all of the studs can provide a hold down feature, one or more of the stud could also provide a locating feature. Further, the invention of this application could also include one or more locating features separate from studs 16 wherein studs 16 only hold the top tooling relative to block 12. Any locating features known in the art could be utilized in combination with the invention of this application.

In yet other embodiments, studs 16, the stud passages 50-53 and/or locating hole portion 148 can include a lead in taper or chamfer to help align and guide the stud into the passage. Yet even further, one or more of the stud passages can be oversized so that the stud utilized in that particular passage in assured to have only a hold down effect. This can be utilized to better control which studs locate and which studs only hold down. For example, in the arrangement shown, two of the four studs can be locating studs and the other two can be only hold down and/or locking studs. This locking and alignment feature can also be coupled with special stud and stud passage spacings to help assure both proper alignment and orientation of block 12 to the subplate. In this respect, the stud position could be configured such that system 10 can only be position on the sub plate in one orientation thereby prevent improper alignment of the top tooling. In other embodiments, block 12 could be symmetrical.

In that mounting system can include both a locating feature and a hold down or locking feature, system 10 can both hold the associated device relative to base block 12 and position the associated device relative to the base block in a predetermined location. As can be appreciated, this can be used to quickly mount the associate device in a desired position and/or repeatedly mount multiple top tooling devices in a (for example) machining operation to run production. Studs 16 can include an interengagement configuration to help secure the stud to an associated device. This can include, but is not limited to, a threaded opening 140 and/or a pilot head 142. As can be appreciated, threaded opening 140 can be any threaded opening and pilot head can be any shape including any mating shape.

While a two locking region plunger is shown in the figures of this application, the number of locking regions per plunger is unlimited. For example, a single locking region could be utilized which could be used to secure a single dumb bell riser. Or, three or more regions could be used for larger and/or more precise mounting configurations.

In yet other embodiments, the plunger can be configured to be inset within the plunger passage when in the locked condition. This can be utilized to prevent the plunger from interfering with an associated operation such as a machining operation. For example only, the mounting system of this application can be utilized on a 5 axis machine wherein the machining head can move about and below the part being machined. As can be appreciated, a plunger extending outwardly of base 12 could become an obstacle for this machining head. Further, the invention of this application can be used in combination with any other tooling known in the art or which will be known in the art in the future. Again, this can include a wide range of sub plates, risers both above and below the base block and vises. It has been found to work particularly well with dove tail vises.

Yet even further, the system can further include a mounting arrangement 150 to secure the base block to these other workholding elements. This can include, but is not limited to, threaded screws and locating pins, and assignee's BALL LOCK system or other systems such as the ones disclosed in U.S. patent application Ser. No. 12/754,026 to Schron which is incorporate by reference into the specification of this application.

Other embodiments include one or more hold down studs 16 being joinable to the (for example only) fixturing plate, a dumb bell riser and a vise. In other embodiments, the stud can be a part of these devices wherein the associated device is manufacture with one or more hold down studs.

In yet other embodiments, the system can include a plunger retainer 160 which extends through base block 12 and engages plunger 14. Retainer 160 can be a permanent in or similar structure mounted in block 12 or can be a removable structure to allow for the removal of plunger 14 from base block 12. Shown is a threaded plug to allow for the removal of this retainer. Retainer 160 can have multiple functions for system 10. One of these functions can include retainer 160 extending into a pocket or recess 162 of plunger 14 and/or sleeve 118 as shown to maintain plunger 14 within the plunger passage. Further, plunger 160 can maintain a desired orientation of the plunger and/or plunger sleeve within the passage and can prevent unwanted rotation of the plunger or plunger sleeve relative to the passage. As discussed above, plunger 14 can include a plunger sleeve 118 and retainer 160 can be used to maintain the desired orientation of the sleeve as the plunger nut is rotated. Further, the relationship between retainer 160 and recess 162 can act as a stop for the travel of plunger 14 within the plunger passage. This stop can be either a stop for the locked position and/or a stop for the unlocked condition. When used a stop for the locked condition, the stop can be used to prevent damage to either the plunger or the stud from over torqueing the plunger.

Figure 8:
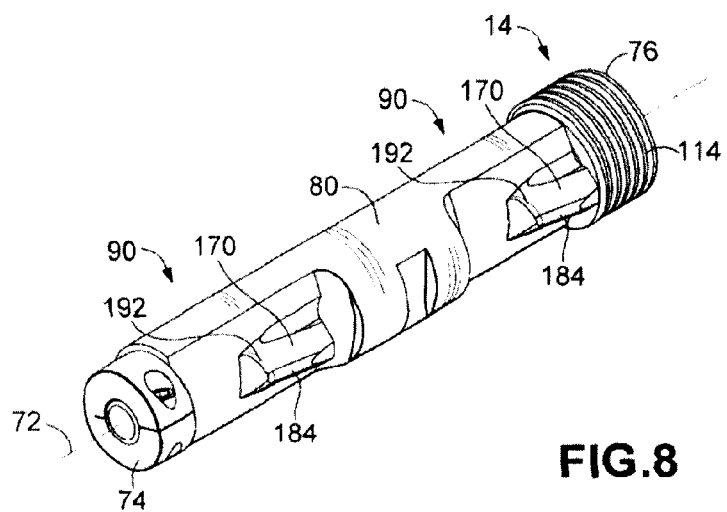
FIG. 8 is a perspective view of a plunger according to certain aspects of the invention.
Figure 9:
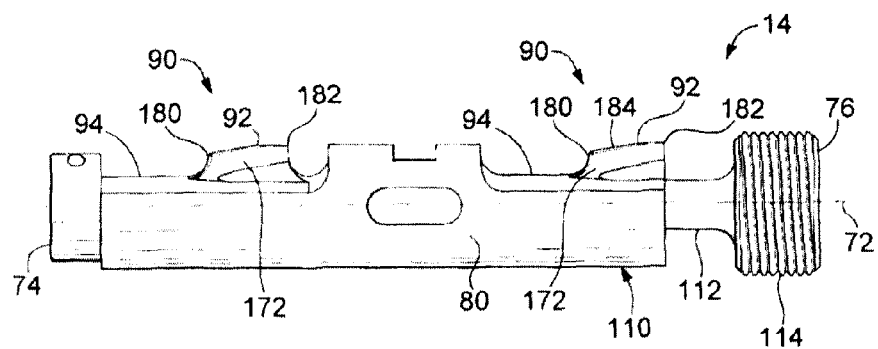
FIG. 9 is a side view of the plunger shown in FIG. 8 having a slightly modified configuration.
Figure 10:
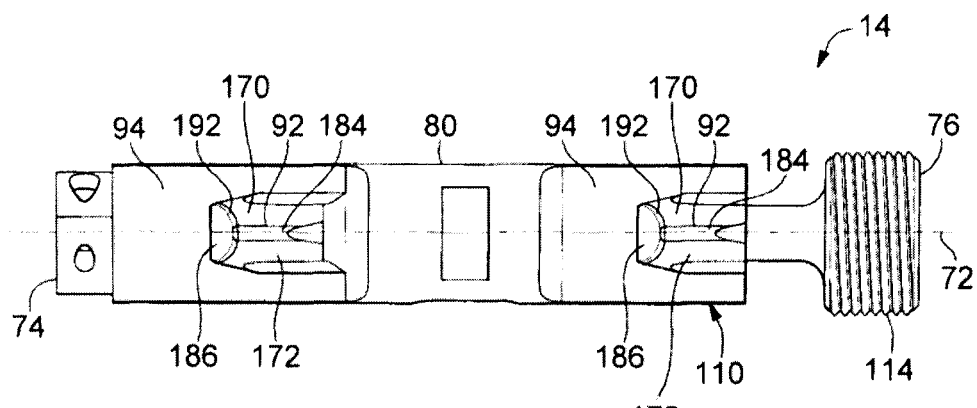
FIG. 10 is a top side view of the plunger shown in FIG. 9.
Figure 11:
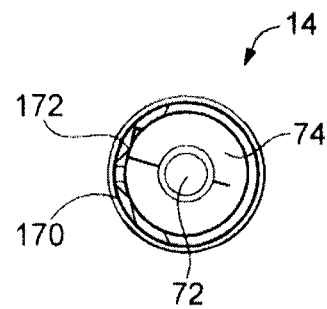
FIG. 11 is an end view of the plunger shown in FIG. 8.
Figure 12:
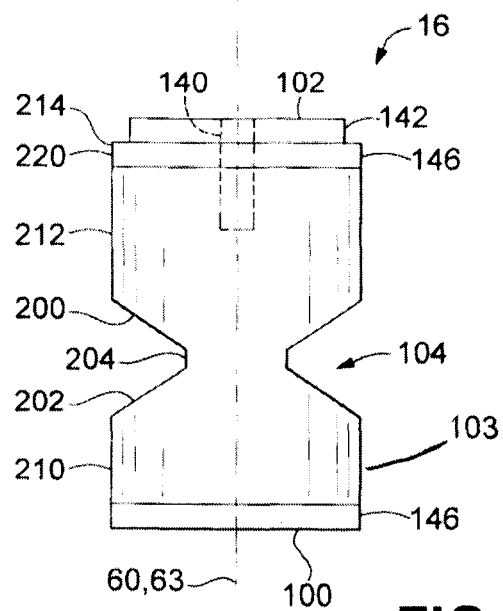
FIG. 12 is a side view of a stud according to certain aspects of the invention.

With special reference to FIGS. 8-10, cams 92 are axially extending cams that generally extend parallel to plunger axis 72 but include cam surfaces 170 and 172 that begin near clearance path 94 at a first end 180 and extend to a second end 182. However, cam surfaces 170 & 172 can diverge from one another and diverge from axis 72 thereby forming a cam having a generally V-shaped cross-sectional configuration having a base edge 184 that can be in the same plane as axis 72, but which diverges radially from axis 72 from end 180 to end 182. Base edge 184 can directly connect cam surfaces 170 & 172 and can include a radiused portion 186 separating these surfaces. Further, edge 184 can further include one or more relief cuts between cam surfaces 170 & 172. In addition, cams 92 can one or more lead in cuts 192 at or near end 180 to help facilitate and guide the cam into stud cams 104 of studs 16. However, while V-shape cams are shown and described with two cam surfaces, cams 92 could include a single cam surface that is generally aligned axially with plunger axis 72 and which diverges from axis 72 to lockingly engage with studs 16.

Similarly, stud cams 104 can be V-shaped having cam surfaces 200 and 202 that extend from a base edge 204 away from one another toward outer surface 103. Further base edge 204 can include a radiused portion or even a surface portion between cam surfaces 200 and 202. In greater detail, studs 16 can be cylindrical studs wherein surface 103 is cylindrical and extends between stud inner end 100 and stud outer end 102, but which does not need to extend entirely between these ends. As is shown, outer surface includes three sections, namely, inner surface section 210, central surface section 212 and outer surface section 214. In the embodiment shown, stud cam 104 is positioned between sections 210 and 212 and these sections can have a similar dimension configured to be received in stud passages 50-53. As should be noted for all components described in this application, each component (such as the studs and/or plungers) do not need to have the same dimensions wherein different stud sizes (diameters, widths, lengths, etc.) could be utilized. In order to reduce the play between the studs and the stud passages, studs 16 can include one or more bearing portions 146 as discussed above. Again, these can be configured to provide a close tolerance fit between the stud and the corresponding passage or a tapered locking fit therebetween. In one embodiment, the bearing surface can be formed in a stud collar 220 that includes surface portion 214. Further, collar 220 could be a removable so that it can be replaced if worn. Further, by including a separate component for the "bearing portion," the collar can include a different material treatment and/or be formed by a different material having better wear characteristics without the expense of producing the entire stud from this material and/or treatment. Other bearing portions of stud 16 could also be formed by a collar.

In operation, as plunger 14 is tightened, axial cam 92 is directed into cam 104 and at first can enter with minimal resistance. However, as cam 92 continues to enter is directed into cam 104, cam surfaces 170 and/or 172 engage surfaces 200 and/or 202 and begin to align stud 16 into the locked condition (shown in FIG. 6A). In this embodiment, cam surface 170 is facing cam surface 200 and cam surface 172 is facing cam surface 202. While both sets of four cam surfaces could engage one another to position stud 16 into a central locked condition, one or the other set of cam surfaces could engage thereby urging the stud into a downward locked condition or an upward locked condition. Yet even further, the respective cam surfaces could be symmetrical wherein one or more of studs 16 could enter into the stud passages from either side of block 12 thereby creating a two-side block configuration. As can be appreciated, in this particular set of embodiments, stud passages would need to be through holes and/or differently machined holes (not shown) As is discussed above, while two plungers and four studs are shown, the invention of this application is not to be limited to a four stud arrangement. Any number of studs and plungers could be included without detracting from the invention of this application. Further, a single stud or more than two studs could be utilized with each plunger. Yet even further, the block could be configured such that a first set of studs (1 or more) are downwardly facing studs (such as extending out from surface 22) and a second set of studs (1 or more) are upwardly facing studs (such as extending out from surface 20) wherein the block 12 can be selectively lockable to more than one associated structures. Even further, multiple plunger arrangement, that are not the though holes described above could also be utilized in accordance with the invention of this application wherein studs could extend from more than one side of block 12 and these studs could lock into a common plunger wherein the plunger pockets or regions of this application do not need to be aligned with one another.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. This includes an inversion of the parts and components wherein the blocks in the description and claims can be changes such that block 12 could be a fixture block mountable to a base block which includes posts or studs 16. Furthermore, the embodiments described above can be combined to form yet other embodiments of the invention of this application. Accordingly, it is to be distinctly understood that the foregoing descriptive matter is to be interpreted nearly as illustrative of the invention and not as a limitation.

Having thus described the invention, it is so claimed:

1. A mounting system for supporting tooling comprising a base block having a first block surface and a second block surface, the first block surface being configured to support an associated object, the base block further including a plunger passage and a stud passage, the plunger passage extending into the base block from the second block surface and extending inwardly along a plunger passage axis, the stud passage extending into the base block from the first block surface along a stud passage axis and the stud passage axis being generally transverse to the plunger passage axis and radially spaced from the plunger passage axis, the stud passage partially intersecting the plunger passage forming a locking region between the plunger passage axis and stud passage axis, the system further including a plunger extending along a plunger body axis between an inner plunger end and an outer plunger end, the plunger including an outer side surface between the inner and outer plunger ends that extends about the plunger body axis, the plunger passage being shaped to receive the plunger in a sliding relationship and allowing the plunger to slide axially in the plunger passage along the passage axis, the plunger being axially positionable in the passage between an unlocked position and a locked position that are axially spaced from one another along the passage axis, the plunger having a radial cam region extending inwardly from the outer side surface and between the plunger ends facing radially outwardly from the plunger body axis, the radial cam region including an axially extending locking plunger cam and a clearance path axially adjacent the plunger cam along the plunger body axis, the locking plunger cam extending between a first end and a second end wherein the first end is the lead in end, at least a portion of the outer side surface extending beyond the lead in end of the locking plunger cam, the stud passage being shaped to receive an associated stud, the associated stud extending between a stud inner end and a stud outer end along a stud body axis, the associated stud having a stud cam between the stud ends transverse to the study body axis, the stud cam being shaped to engage the plunger cam, when the plunger is in the unlocked position the clearance path of the cam region is aligned with the stud passage allowing the stud cam of the associated stud to enter the locking region of the base block, once the stud cam is positioned in the locking region axial movement of the plunger along the plunger axis toward the locked position urging the plunger cam into the associated stud cam and the plunger cam at least partially axially aligning the associated stud in the stud passage, an engagement force between the plunger and stud cams urging the associated stud into a locked condition thereby locking the associated stud relative to the base block and providing a hold-down force between the base block and the associated stud.

2. A mounting system according to claim 1, wherein the plunger includes a plunger thread and the base block including a block thread threadingly engagable with the plunger thread to produce axial movement of the plunger.

3. A mounting system according to claim 1, wherein the plunger further includes a rotating plunger body and a sliding plunger sleeve, the plunger body being rotatable relative to the base block and the sleeve being rotatable about the plunger axis relative to the plunger body such that the sleeve is prevented from rotation relative to the base block and slides within the plunger passage, the plunger sleeve including the outer side surface, the plunger cam and the clearance path, the plunger sleeve extending beyond the lead in end of the locking plunger cam, the plunger body including a plunger thread.

4. A mounting system according to claim 1, wherein the plunger further includes a plunger body and a plunger sleeve, the plunger sleeve being rotatable about the plunger axis relative to the plunger body, the plunger sleeve including the plunger cam.

5. A mounting system according to claim 4, wherein the base block further includes a plunger retainer extending into the plunger passage, the plunger retainer at least partially controlling alignment of the plunger cam.

6. A mounting system according to claim 4, wherein the plunger retainer controls at least one of axial travel of the plunger in the plunger passage and rotation of the plunger in the plunger passage.

7. A mounting system according to claim 1, wherein the stud passage extends downwardly from the block top.

8. A mounting system according to claim 1, further including a stud and the stud being joined to an associated object, the stud extending between an inner end of the stud and an outer end of the stud along a stud axis of the stud, the stud having a locking stud cam between the stud ends and transverse to the stud axis, when the plunger is in the unlocked position the clearance path of the plunger is aligned with the stud passage allowing the stud cam to enter the locking region, once the stud is in the locking region axial movement of the plunger along the plunger axis directing the plunger cam into the stud cam thereby engaging the plunger cam against the stud cam and urging the stud into the stud passage and providing a hold-down force between the base block and the stud.

9. A mounting system according to claim 8, wherein the stud includes a locating ring having a radially outward surface machined to a desired tolerance, the stud passage including a locating hole portion having an inward surface machined to a desired tolerance, the inward surface and outer surface being dimensioned to produce a close tolerance fit between the stud and the stud passage for at least in part locating the stud relative to the base plate.

10. A mounting system according to claim 1, wherein the system includes a plurality of plungers and a plurality of studs, at least one of the plurality of stud including a locating stud wherein at least a portion of the at least one stud has a close tolerance fit with the stud passage to locate the associated object relative to the base block.

11. A mounting system according to claim 10, wherein the plurality of studs is greater than the plurality of plungers.

12. A mounting system according to claim 1, wherein the stud passage is a first stud passage and the base block further including a second and a third stud passage spaced axially from the first stud passage along the plunger axis forming a second and a third locking region respectively, the radially extending plunger cam region is a first cam region with a first plunger cam and an axially spaced first clearance path, the plunger further including a second and a third cam region with a second and third plunger cams and axially spaced second and third clearance paths for the second and third cam region respectively, the system including three studs.

13. A mounting system according to claim 1, wherein the plunger passage is a blind hole.

14. A mounting system according to claim 1, wherein the plunger is inset within the plunger passage when in the locked condition.

15. A mounting system according to claim 1, further including a mounting arrangement to secure the base block to another associated object.

16. A mounting system according to claim 15, wherein the mounting arrangement includes openings in the base block and at least one of threaded screws and locating pins.

17. A mounting system according to claim 1, wherein the stud cam extends about the stud.

18. A mounting system according to claim 1, wherein the stud cam is an axial pocket and at least in partially locates the stud rotationally about the stud axis.

19. A mounting system according to claim 1, wherein the stud is shaped to be received in the stud passage in a predetermined rotational position.

20. A mounting system according to claim 1, wherein the outer side surface is cylindrical and extends generally to both ends of the plunger.

21. A mounting system for supporting tooling comprising a base block having a first block surface and a second block surface, the first block surface being configured to support an associated object, the base block further including a plunger passage and a stud passage, the plunger passage extending into the base block from the second block surface and extending inwardly along a plunger passage axis, the stud passage extending into the base block from the first block surface along a stud passage axis and the stud passage axis being generally transverse to the plunger passage axis and radially spaced from the plunger passage axis, the stud passage partially intersecting the plunger passage forming a locking region between the plunger passage axis and stud passage axis, the system further including a plunger extending along a plunger body axis between an inner plunger end and an outer plunger end, the plunger including an outer side surface between the inner and outer plunger ends that extends about the plunger body axis, the plunger passage being shaped to receive the plunger in a sliding relationship and allowing the plunger to slide axially in the plunger passage along the passage axis, the plunger being axially positionable in the passage between an unlocked position and a locked position that are axially spaced from one another along the passage axis, the plunger having a radial cam region between the plunger ends facing radially outwardly from the plunger body axis, the radial cam region including an axially extending locking plunger cam and a clearance path axially adjacent the plunger cam along the plunger body axis, the stud passage being shaped to receive an associated stud, the associated stud extending between a stud inner end and a stud outer end along a stud body axis, the associated stud having a stud cam between the stud ends transverse to the study body axis, the stud cam being shaped to engage the plunger cam, when the plunger is in the unlocked position the clearance path of the cam region is aligned with the stud passage allowing the stud cam of the associated stud to enter the locking region of the base block, once the stud cam is positioned in the locking region axial movement of the plunger along the plunger axis toward the locked position urging the plunger cam into the associated stud cam and the plunger cam at least partially axially aligning the associated stud in the stud passage, an engagement force between the plunger and stud cams urging the associated stud into a locked condition thereby locking the associated stud relative to the base block and providing a hold-down force between the base block and the associated stud wherein the stud passage is a first stud passage and the locking region is a first locking region, the base block further including a second stud passage spaced axially from the first stud passage along the plunger axis forming a second locking region, the radial cam region is a first cam region with a first plunger cam and an axially spaced first clearance path, the plunger further including a second radial cam region with a second plunger cam and an axially spaced second clearance path for the second cam region.

22. A mounting system according to claim 21, further including a first stud and a second stud, the first stud being configured to enter the first stud passage and the second stud being configured to enter the second stud passage, each of the first and second studs including a stud inner end and a stud outer end along a stud axis, the each stud having a locking stud cam between the stud ends and transverse to the stud axis, when the plunger is in the unlocked position the corresponding clearance path of the plunger being aligned with the first and second stud passages allowing the stud cam of the each stud to enter the corresponding locking region, once the each stud is in the locking region axial movement of the plunger along the plunger axis directing corresponding pull plunger cams into the corresponding stud cams thereby engaging the plunger cams against the stud cams.

23. A mounting system according to claim 22, wherein at least one of the first and second studs includes a locating ring having a radially outward surface machined to a desired tolerance, at least one of the stud passages including a locating hole portion having an inward surface machined to a desired tolerance, the inward surface and outer surface being dimensioned to produce a close tolerance fit between the at least one stud and the at least one stud passage for at least in part locating the stud relative to the base plate.

24. A mounting system according to claim 22, wherein the system includes a plurality of studs and at least one of the plurality of studs including a locating ring having a radially outward surface machined to a desired tolerance, at least one of the stud passages including a locating hole portion having an inward surface machined to a desired tolerance, the inward surface and outer surface being dimensioned to produce a close tolerance fit between the at least one stud and the at least one stud passage for at least in part locating the stud relative to the base plate.

25. A mounting system for supporting tooling comprising a base block and at least one locking stud, the base block having a first block surface and a second block surface, the first block surface being configured to support an associated object, the at least one locking stud being attachable to the associated object such that the at least one stud is fixed relative to the associate object, the base block further including a plunger passage and a stud passage, the plunger passage extending into the base block from the second block surface and extending inwardly along a plunger passage axis, the stud passage extending into the base block from the first block surface along a stud passage axis and the stud passage axis being generally transverse to the plunger passage axis and radially spaced from the plunger passage axis, the stud passage partially intersecting the plunger passage forming a locking region between the plunger passage axis and stud passage axis, the system further including a plunger extending along a plunger body axis between an inner plunger end and an outer plunger end, the plunger including an outer side surface between the inner and outer plunger ends that extends about the plunger body axis, the plunger passage being shaped to receive the plunger in a sliding relationship and allowing the plunger to slide axially in the plunger passage along the passage axis, the plunger being axially positionable in the passage between an unlocked position and a locked position that are axially spaced from one another along the passage axis, the plunger having a radial cam region extending inwardly from the outer side surface and between the plunger ends facing radially outwardly from the plunger body axis, the radial cam region including an axially extending locking plunger cam and a clearance path axially adjacent the plunger cam along the plunger body axis, the locking plunger cam extending between a first end and a second end wherein the first end is the lead in end, at least a portion of the outer side surface extending beyond the lead in end of the locking plunger cam, the stud passage being shaped to receive one of the at least one stud, the at least one stud extending between a stud inner end and a stud outer end along a stud body axis, the at least one stud having a stud cam between the stud ends transverse to the stud body axis, the stud cam being shaped to engage the plunger cam, when the plunger is in the unlocked position the clearance path of the cam region is aligned with the stud passage allowing the stud cam of the at least one stud to enter the locking region of the base block, once the stud cam is positioned in the locking region axial movement of the plunger along the plunger axis toward the locked position urging the plunger cam into the stud cam and the plunger cam at least partially axially aligning the stud in the at least one stud passage, an engagement force between the plunger and stud cams urging the at least one stud into a locked condition thereby locking the at least one stud relative to the base block and providing a hold-down force between the base block and the at least one stud.

26. A mounting system according to claim 25, wherein the plunger further includes a plunger body and a plunger sleeve, the plunger sleeve being rotatable about the plunger axis relative to the plunger body, the plunger sleeve including the plunger cam and the plunger body including a plunger thread.

27. A mounting system according to claim 25, wherein the base block further includes a plunger retainer extending to the plunger passage, the plunger retainer at least partially controlling alignment of the plunger cam.

28. A mounting system according to claim 27, wherein the plunger retainer controls at least one of axial travel of the plunger in the plunger passage and rotation of the plunger in the plunger passage.

29. A mounting system for supporting tooling comprising a base block and at least one locking stud, the base block having a first block surface and a second block surface, the first block surface being configured to support an associated object, the at least one locking stud being attachable to the associated object such that the at least one stud is fixed relative to the associate object, the base block further including a plunger passage and a stud passage, the plunger passage extending into the base block from the second block surface and extending inwardly along a plunger passage axis, the stud passage extending into the base block from the first block surface along a stud passage axis and the stud passage axis being generally transverse to the plunger passage axis and radially spaced from the plunger passage axis, the stud passage partially intersecting the plunger passage forming a locking region between the plunger passage axis and stud passage axis, the system further including a plunger extending along a plunger body axis between an inner plunger end and an outer plunger end, the plunger including an outer side surface between the inner and outer plunger ends that extends about the plunger body axis, the plunger passage being shaped to receive the plunger in a sliding relationship and allowing the plunger to slide axially in the plunger passage along the passage axis, the plunger being axially positionable in the passage between an unlocked position and a locked position that are axially spaced from one another along the passage axis, the plunger having a radial cam region between the plunger ends facing radially outwardly from the plunger body axis, the radial cam region including an axially extending locking plunger cam and a clearance path axially adjacent the plunger cam along the plunger body axis, the stud passage being shaped to receive one of the at least one stud, the at least one stud extending between a stud inner end and a stud outer end along a stud body axis, the at least one stud having a stud cam between the stud ends transverse to the study body axis, the stud cam being shaped to engage the plunger cam, when the plunger is in the unlocked position the clearance path of the cam region is aligned with the stud passage allowing the stud cam of the at least one stud to enter the locking region of the base block, once the stud cam is positioned in the locking region axial movement of the plunger along the plunger axis toward the locked position urging the plunger cam into the stud cam and the plunger cam at least partially axially aligning the stud in the at least one stud passage, an engagement force between the plunger and stud cams urging the at least one stud into a locked condition thereby locking the at least one stud relative to the base block and providing a hold-down force between the base block and the at least one stud wherein the stud passage is a first stud passage and the locking region is a first locking region, the base block further including a second stud passage spaced axially from the first stud passage along the plunger axis forming a second locking region, the radial cam region is a first cam region with a first plunger cam and an axially spaced first clearance path, the plunger further including a second radial cam region with a second plunger cam and an axially spaced second clearance path for the second cam region, the mounting system including at least to studs.

* * * * *